US012311575B2

(12) United States Patent
Karau

(10) Patent No.: US 12,311,575 B2
(45) Date of Patent: May 27, 2025

(54) APPARATUS FOR MAKING A MASONRY BLOCK WITH A ROUGHENED SURFACE

(71) Applicant: PAVESTONE, LLC, Atlanta, GA (US)

(72) Inventor: William H. Karau, Southlake, TX (US)

(73) Assignee: PAVESTONE, LLC, Atlanta, GA (US)

( * ) Notice: Subject to any disclaimer, the term of this patent is extended or adjusted under 35 U.S.C. 154(b) by 1135 days.

(21) Appl. No.: 16/538,466

(22) Filed: Aug. 12, 2019

(65) Prior Publication Data

US 2020/0047373 A1 Feb. 13, 2020

Related U.S. Application Data

(60) Provisional application No. 62/718,172, filed on Aug. 13, 2018.

(51) Int. Cl.
*B28B 7/00* (2006.01)

(52) U.S. Cl.
CPC .......... *B28B 7/0064* (2013.01); *B28B 7/0061* (2013.01)

(58) Field of Classification Search
CPC . B28B 7/0061; B28B 7/0064; B28B 17/0027; B28B 7/183
See application file for complete search history.

(56) References Cited

U.S. PATENT DOCUMENTS

| | | | | |
|---|---|---|---|---|
| 3,940,229 | A | 2/1976 | Hutton | |
| 5,078,940 | A | 1/1992 | Sayles | |
| 5,217,630 | A | 6/1993 | Sayles | |
| 5,879,603 | A | 3/1999 | Sievert | |
| 6,113,379 | A | 9/2000 | LaCroix et al. | |
| 6,138,983 | A | 10/2000 | Sievert | |
| 6,209,848 | B1 | 4/2001 | Bolles et al. | |
| 6,224,815 | B1 | 5/2001 | LaCroix et al. | |
| 6,464,199 | B1 | 10/2002 | Johnson | |
| 6,609,695 | B2 | 8/2003 | LaCroix et al. | |
| 7,100,886 | B2 | 9/2006 | Hammer et al. | |
| 7,591,447 | B2 | 9/2009 | Hammer et al. | |
| 2006/0145050 | A1* | 7/2006 | Price | B28B 7/0097 249/160 |
| 2012/0126451 | A1* | 5/2012 | Owen | B28B 7/346 264/225 |
| 2012/0192522 | A1 | 8/2012 | Johnson et al. | |
| 2021/0395971 | A1* | 12/2021 | Anderson | E02D 29/0266 |

* cited by examiner

*Primary Examiner* — John J DeRusso
*Assistant Examiner* — Victoria Bartlett
(74) *Attorney, Agent, or Firm* — Jackson Walker LLP; Christopher J. Rourk

(57) ABSTRACT

An apparatus comprising a substantially smooth internal mold surface forming a cavity and one or more roughened sections of the substantially smooth internal mold surface having a plurality of irregular grooves, wherein each roughened section is inclined with a wider base and a narrower top.

20 Claims, 9 Drawing Sheets

APPARATUS FOR MAKING A MASONRY BLOCK WITH A ROUGHENED SURFACE

RELATED APPLICATIONS

The present application claims priority to and benefit of U.S. Provisional Application Ser. No. 62/718,172, filed Aug. 13, 2018, which is hereby incorporated by reference for all purposes as if set forth herein in its entirety.

TECHNICAL FIELD

The present disclosure relates generally to masonry blocks, and more specifically to a method and apparatus for manufacturing a masonry block with a roughened surface.

BACKGROUND OF THE INVENTION

Roughening masonry blocks is known, but doing so results in unacceptable losses of masonry blocks that would otherwise have been successfully manufactured. These losses result in substantial increases in the cost of such blocks to offset those losses.

SUMMARY OF THE INVENTION

An apparatus comprising a substantially smooth internal mold surface forming a cavity and one or more roughened sections of the substantially smooth internal mold surface having a plurality of irregular grooves, wherein each roughened section is inclined with a wider base and a narrower top.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
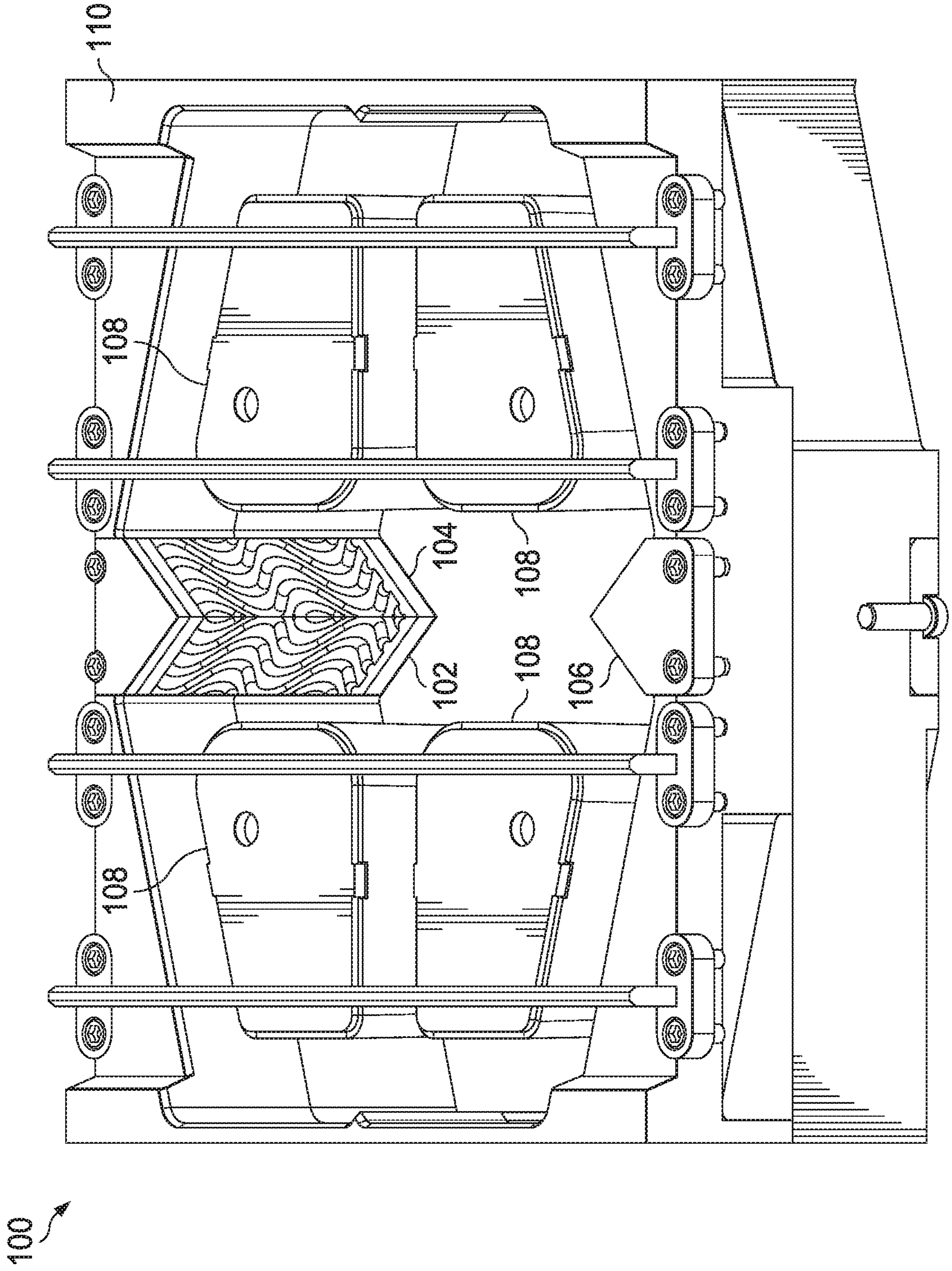
FIG. 1 is a diagram of a top rear perspective of a mold in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Creating a roughened surface on a freshly compacted masonry block during stripping, such as by dragging a dislocation-inducing mold feature along the masonry block surface during stripping, suffers from the problem that such systems and methods typically fail to account for the volumetric expansion of the masonry materials due to such dislocation, resulting in lateral pressures that cause cracking of masonry blocks during stripping. The present disclosure alleviates those losses by drafting a mold wall and including roughening elements into the drafted mold wall.

There are generally three types of dislocation-inducing mold features for use with the disclosed drafted mold wall. A first is a mold wall with a dislocation-inducing feature at the bottom of a smooth drafted mold wall. The second is a mold wall with a dislocation-inducing surface in a drafted orientation extending from top-to-bottom of the mold wall. The third is a mold wall with a combination of such features.

During manufacture of masonry blocks, the dislocation of sand and gravel particles from their compacted arrangement causes volumetric expansion of the masonry material. Because the bottommost, narrowest aperture of the mold remains constant, the volumetrically expanded material accumulates above the bottommost, narrowest aperture as the strip of the mold from the masonry block proceeds, creating vertically non-uniform roughness and increased stripping resistance, and increasing the risk of block cracking due to excessive stripping stresses.

The present disclosure overcomes this previously-unrecognized problem with an apparatus and method that incorporates a dislocation-inducing surface which is drafted at an angle that is associated with the magnitude of volumetric expansion. In one example embodiment, the magnitude of volumetric expansion for concrete correlates to a draft angle of about 1.3 degrees, based on a normal mold stripping operation. In this example embodiment, the drafted surface disengages from the freshly-compacted block surface at approximately the same rate as the concrete expands due to dislocation. This apparatus and method provides for a more vertically uniform appearance, lower resistance to stripping, and a lower rate of block cracking and loss during stripping.

A 1.3 degree draft angle can correspond to 5.0 mm of draft over a 223 mm high mold, which is approximately 2.25% of the height. Over an incremental stripping movement Ds, a volumetric expansion of Ds×2.25% due to dislocations caused by the stripping action is expected. The specific amount of dislocation will depend on the masonry material, the degree of roughening and other factors.

FIG. 1 is a diagram of a top rear perspective of a mold 100 in accordance with an example embodiment of the present disclosure. Mold 100 can be fabricated from steel, composite materials or other suitable materials that are suitable for molding masonry materials.

Mold 100 includes a first planar section 102 and a second planar section 104, which meet along an edge to form a v-shaped feature. Each of planar section 102 and planar section 104 are inclined to form a larger area at the base of mold 100 and a narrower area at the top of mold 100, so as to allow mold 100 to be lifted from a masonry compound that has been added to mold 100. In this regard, it is noted that if the first planar surface 102 and second planar surface 104 were inclined in the opposite manner (so as to form a narrower area at the bottom of the mold and a larger area at the top of the mold), then it would not be possible to lift mold 100 from the masonry block formed when a masonry compound has been added to the mold. In addition, a third planar surface and a fourth planar surface are disposed opposite first planar surface 102 and second planar surface 104. These are not explicitly shown, but the top edge 106 of the v-shaped feature formed by the third planar surface and the fourth planar surface can be seen. First planar surface 102 and second planar surface 104 include a non-linear texture pattern that includes irregular non-uniform wave features, but these irregular non-uniform wave features are an example of suitable features that can be used to generate a roughened surface when mold 100 is withdrawn from a masonry block that is cast inside of mold 100. In particular, the irregular grooves provide the independent advantage of being self-cleaning by providing a downward migration path for entrapped material, where the obstructions are less than the friction angle, as compared with other regular features that tend to become easily fouled and to thus fail to provide the function for which they are provided. In this regard, it is both the wavy shape and the varying thickness that helps to prevent fouling, but including the sidewall draft also helps to reduce fouling and improve performance of the mold.

Mold 100 also includes inner features 108, which are used to form a cavity in the masonry block that is made by mold 100. While these inner features 108 are generally oblong and uniform in shape, they can also or alternatively be round, square, rectangular, trapezoidal, irregular or of other suitable shapes and of different sizes. The inner surface of mold 100 other than first planar 102 and second planar surface 104 (and the additional third planar surface and fourth planar surface opposite first planar 102 and second planar surface 104) is generally smooth.

Mold 100 also includes external frame 110, lateral supports, bolts, and other features that are used to aid in the manufacturing process, such as by providing stability to mold 100, to allow mold 100 to be removed from a masonry block or for other suitable purposes.

The planar surfaces of mold 100 are examples of surfaces which can be provided with an irregular feature to generate a roughened texture, but additional surfaces can also or alternatively be provided. For example, planar surface 102 and planar surface 104 can be convex, concave, irregular or can have other suitable configurations, except that they will generally either be inclined so as to allow mold 100 to be easily removed from the masonry block that is formed by mold 100, or they may extend in a direction that is perpendicular to the bottom surface and parallel to the direction of travel when mold 100 is removed, such as for a predetermined distance. In that regard, the features of mold 100 should be understood to be examples only and not requirements that should be implied to be imported into any claim limitations, absent an express indication.

Figure 2:
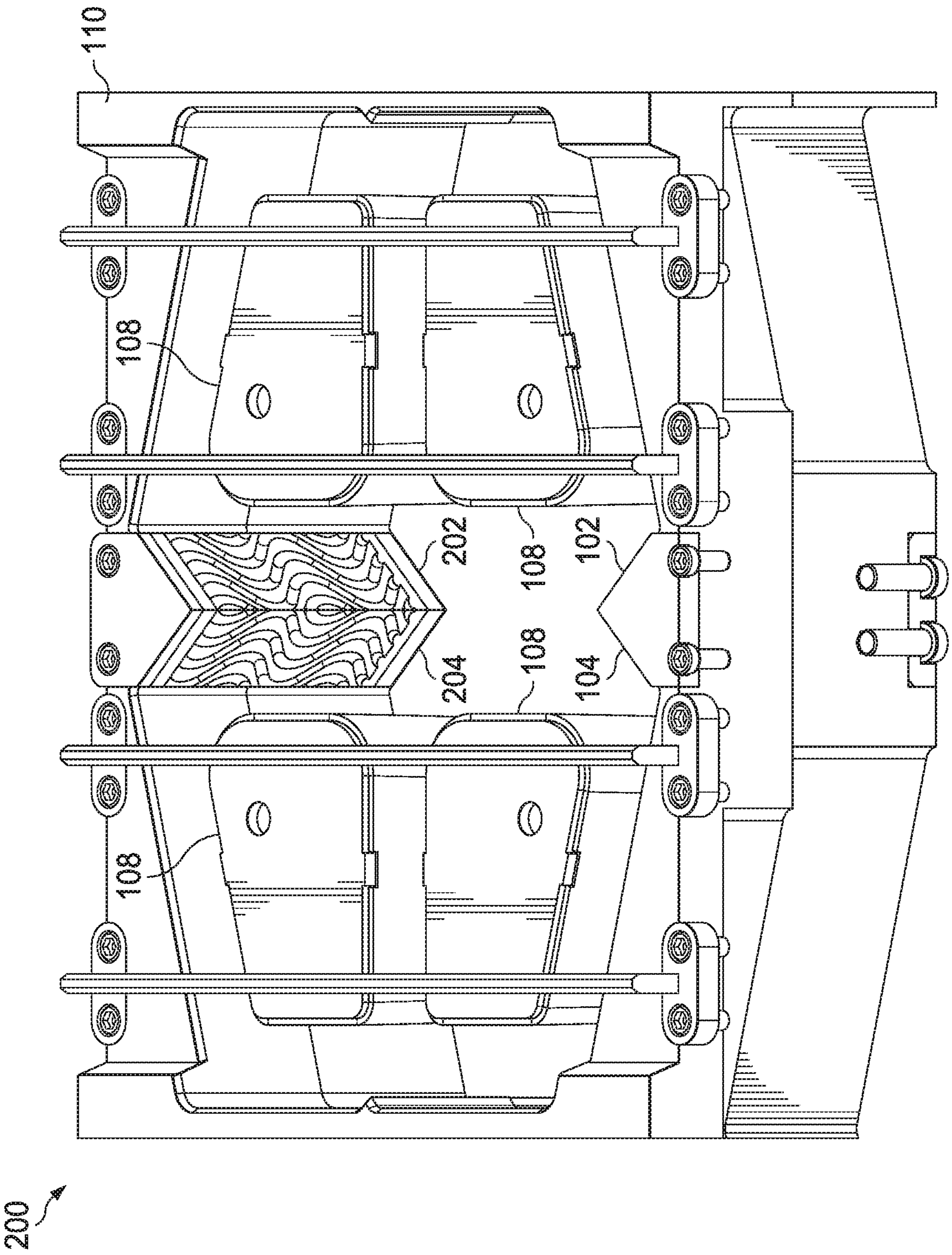
FIG. 2 is a diagram of a top front perspective of a mold in accordance with an example embodiment of the present disclosure.

FIG. 2 is a diagram of a top front perspective of a mold 200 in accordance with an example embodiment of the present disclosure. Mold 200 can be a different view of mold 100, where a third planar surface 202 is opposite the first planar surface 102 of mold 100, and where a fourth planar surface 204 is opposite the second planar surface 104 of mold 100. In addition, mold 200 can include inner features 108, external frame 110 and other suitable features from mold 100, or these features can be altered to provide a different configuration.

Figure 3:
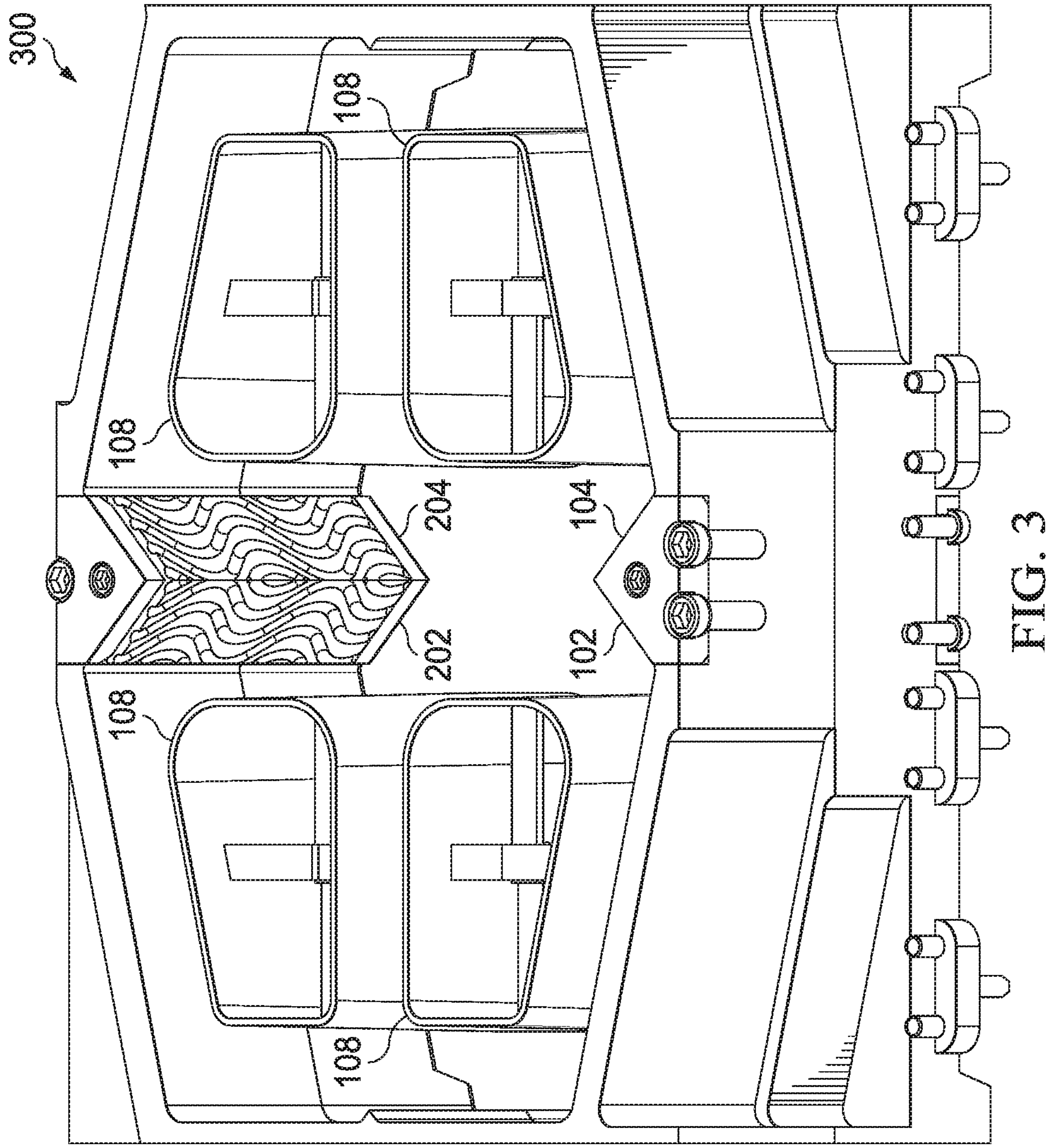
FIG. 3 is a diagram of a bottom front perspective of a mold in accordance with an example embodiment of the present disclosure.

FIG. 3 is a diagram of a bottom front perspective of a mold 300 in accordance with an example embodiment of the present disclosure. Mold 300 can be a different view of mold 100, where a third planar surface 202 is opposite the first planar surface 102 of mold 100, and where a fourth planar surface 204 is opposite the second planar surface 104 of mold 100. In addition, mold 200 can include inner features 108, external frame 110 and other suitable features from mold 100, or these features can be altered to provide a different configuration.

Figure 4:
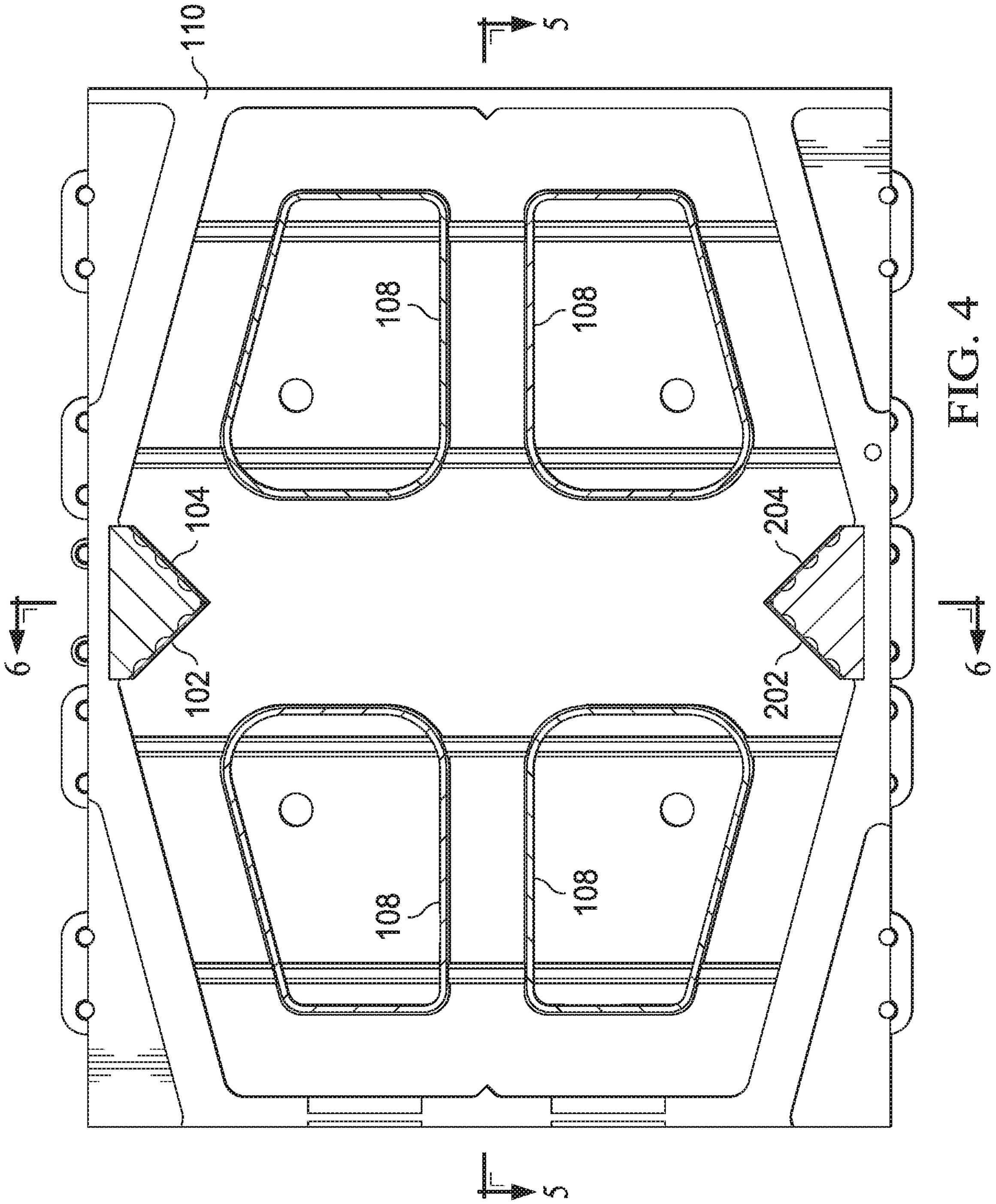
FIG. 4 is a diagram of a top section view of a mold in accordance with an example embodiment of the present disclosure.

FIG. 4 is a diagram of a top section view of a mold 400 in accordance with an example embodiment of the present disclosure. Mold 400 can be a different view of mold 100, where a third planar surface 202 is opposite the first planar surface 102 of mold 100, and where a fourth planar surface 204 is opposite the second planar surface 104 of mold 100. In addition, mold 200 can include inner features 108, external frame 110 and other suitable features from mold 100, or these features can be altered to provide a different configuration.

Figure 5:
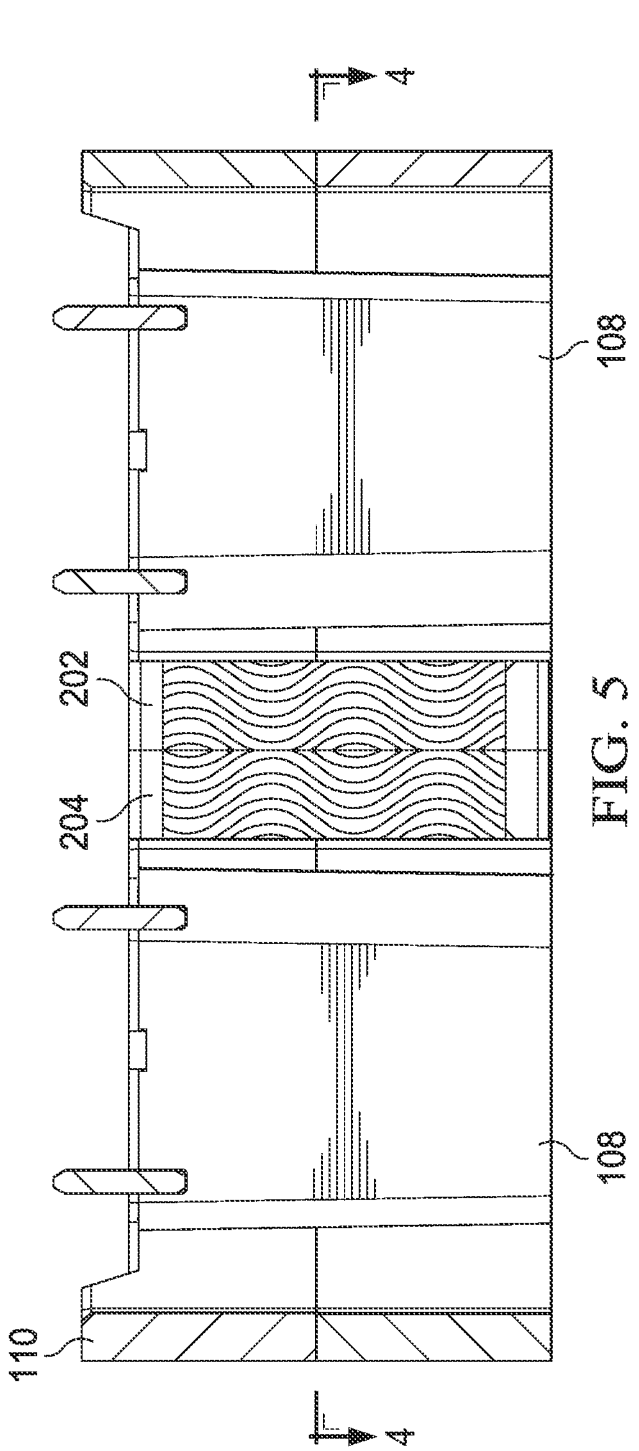
FIG. 5 is a diagram of a middle section view of a mold in accordance with an example embodiment of the present disclosure.

FIG. 5 is a diagram of a middle section view of a mold 500 in accordance with an example embodiment of the present disclosure. Mold 500 can be a view from cut-line 5 of mold 400, where the intersection of a third planar surface 202 and a fourth planar surface 204 are shown. In addition, mold 500 can include inner features 108, external frame 110 and other suitable features from mold 100, or these features can be altered to provide a different configuration.

Figure 6:
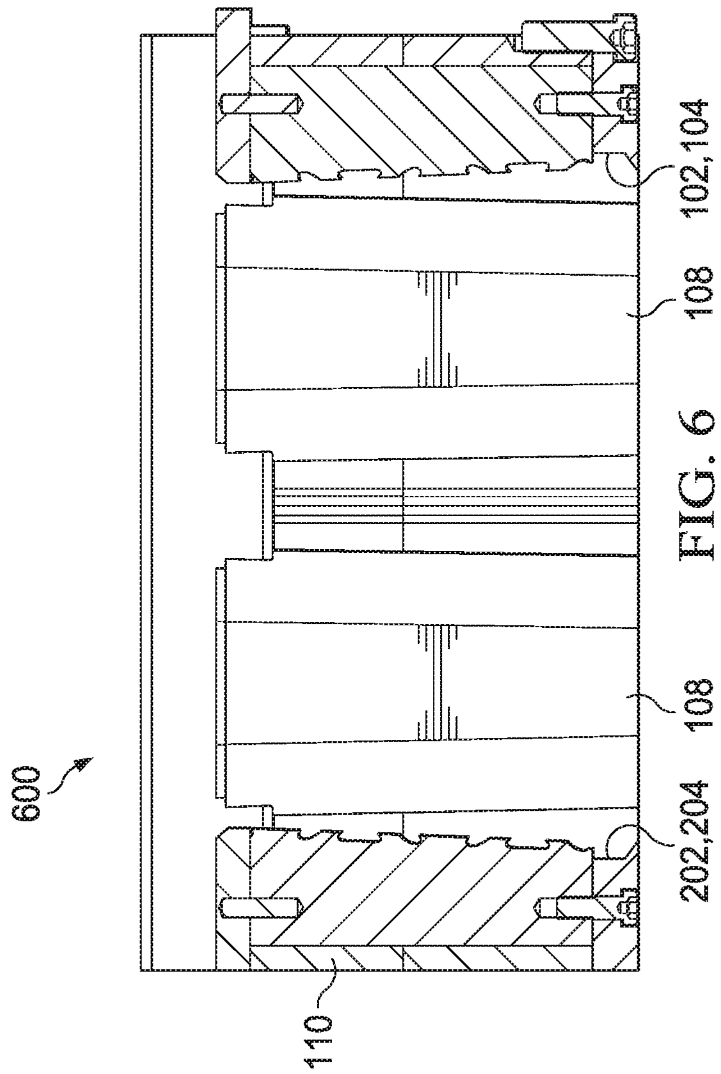
FIG. 6 is a diagram of a left section view of a mold in accordance with an example embodiment of the present disclosure.

FIG. 6 is a diagram of a left section view of a mold 600 in accordance with an example embodiment of the present disclosure. Mold 600 can be a view from cut-line 6 of mold 400, where the intersection of a third planar surface 202 and a fourth planar surface 204 are shown on the left and the intersection of a first planar surface 102 and a second planar surface 104 are shown on the right. As can be seen, these surfaces are inclined so as to allow mold 600 to be removed from a masonry block that has been formed inside of mold 600. In addition, mold 600 can include inner features 108, external frame 110 and other suitable features from mold 100, or these features can be altered to provide a different configuration.

Figure 7:
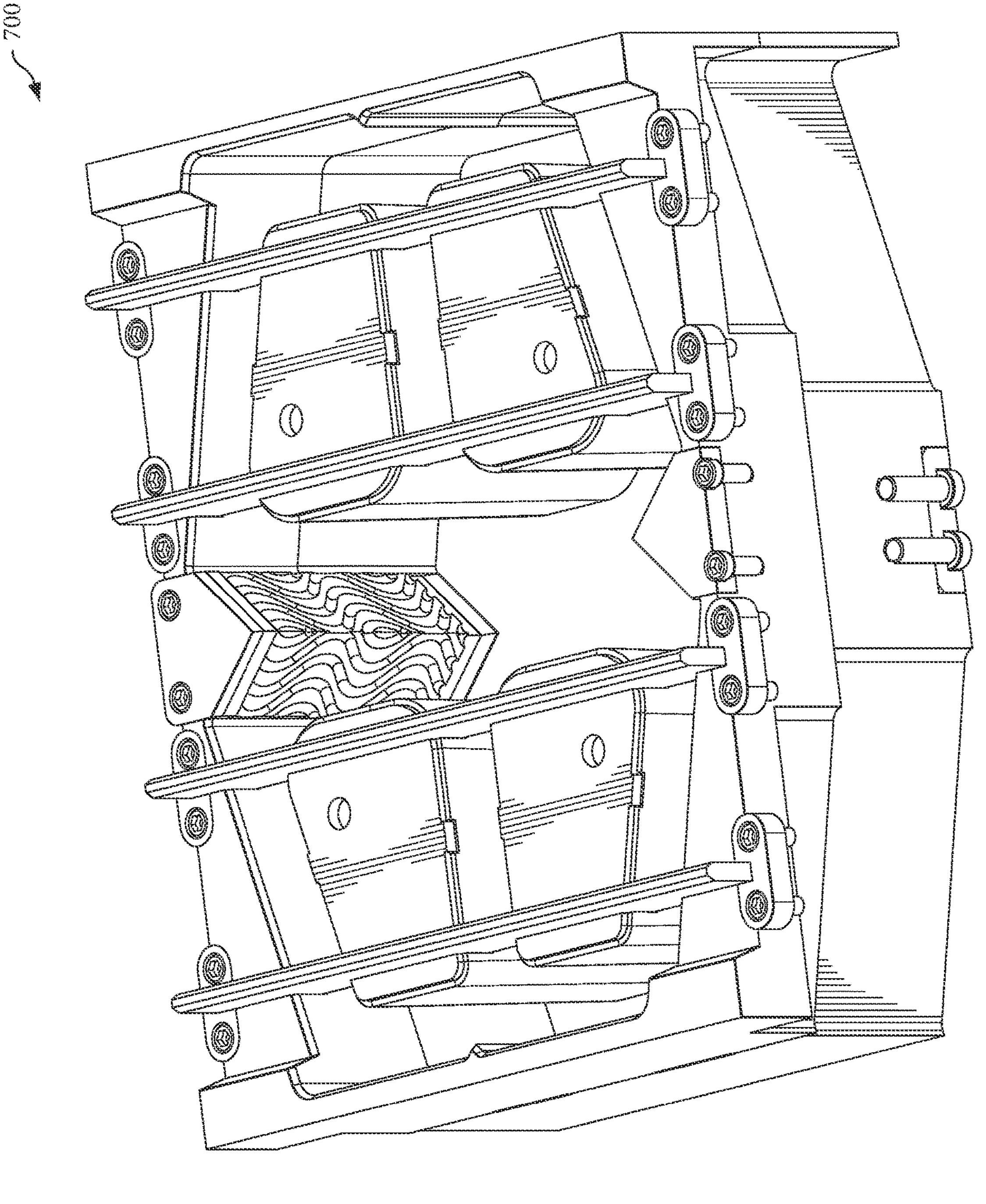
FIG. 7 is a diagram of a top perspective view of a mold in accordance with an example embodiment of the present disclosure.

FIG. 7 is a diagram of a top perspective view of a mold 700 in accordance with an example embodiment of the present disclosure. This perspective view clarifies certain example features of mold 700, which can be similar to features from mold 100, or which can be altered to provide a different configuration.

Figure 8:
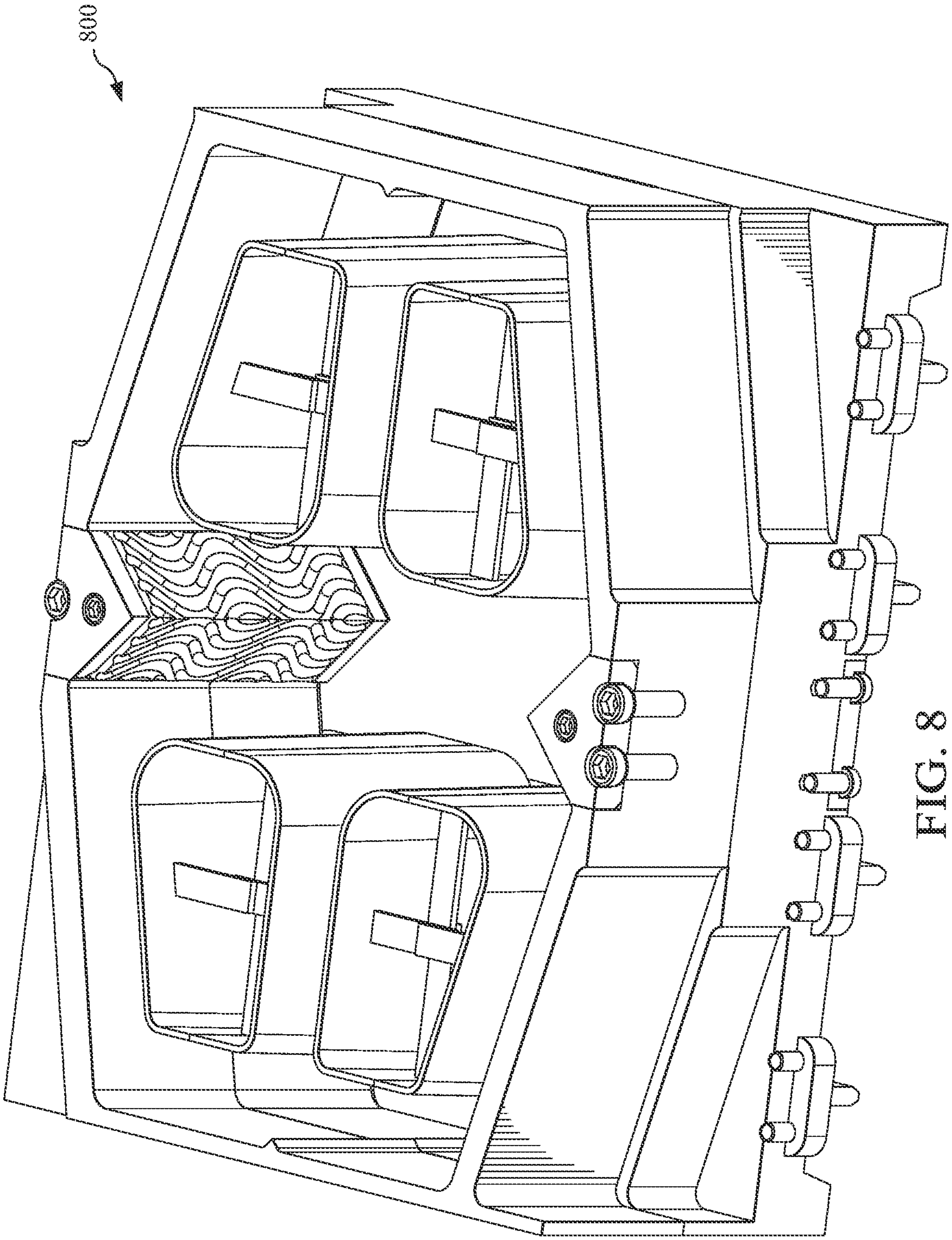
FIG. 8 is a diagram of a bottom perspective view of a mold in accordance with an example embodiment of the present disclosure.

FIG. 8 is a diagram of a bottom perspective view of a mold 800 in accordance with an example embodiment of the present disclosure. This perspective view clarifies certain example features of mold 800, which can be similar to features from mold 100, or which can be altered to provide a different configuration.

Figure 9:
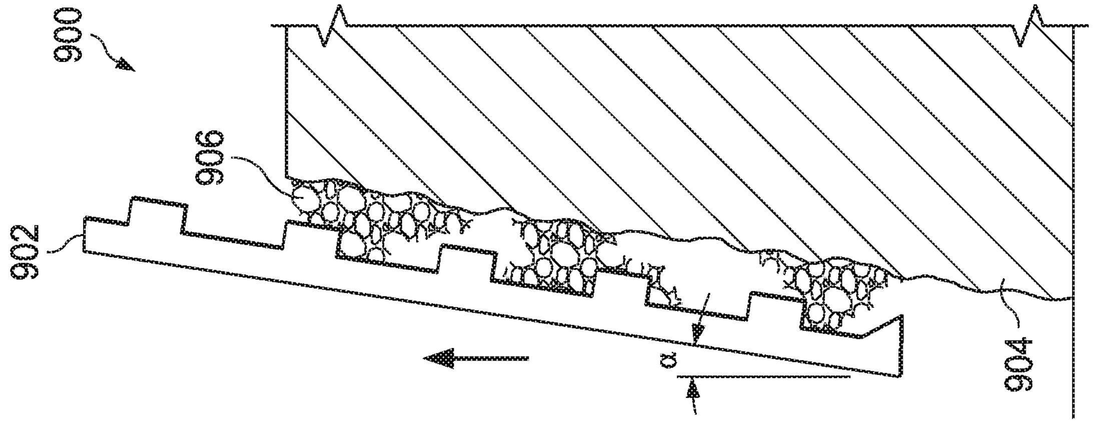
FIG. 9 is a diagram of a mold having a rectangular groove cross section, in accordance with an example embodiment of the present disclosure.

FIG. 9 is a diagram of a mold 900 having a spaced rectangular groove cross section, in accordance with an example embodiment of the present disclosure. Mold 900 includes a plurality of rectangular protrusions from mold wall 902 with an angled protrusion at the bottom, and a draft towards masonry block 904, which allows debris 906 to accumulate to create a roughened surface and which also accommodates for expansion of the masonry. The rectangular protrusions are regularly spaced and have a height that is less than the thickness of the mold wall, but can alternatively have a greater height than the thickness of the mold wall. The rectangular protrusions can alternatively be of different sizes and shapes, can be square, trapezoidal or of other suitable shapes, and the angle of inclination can be approximately 1.3 degrees+/−40%.

Figure 10:
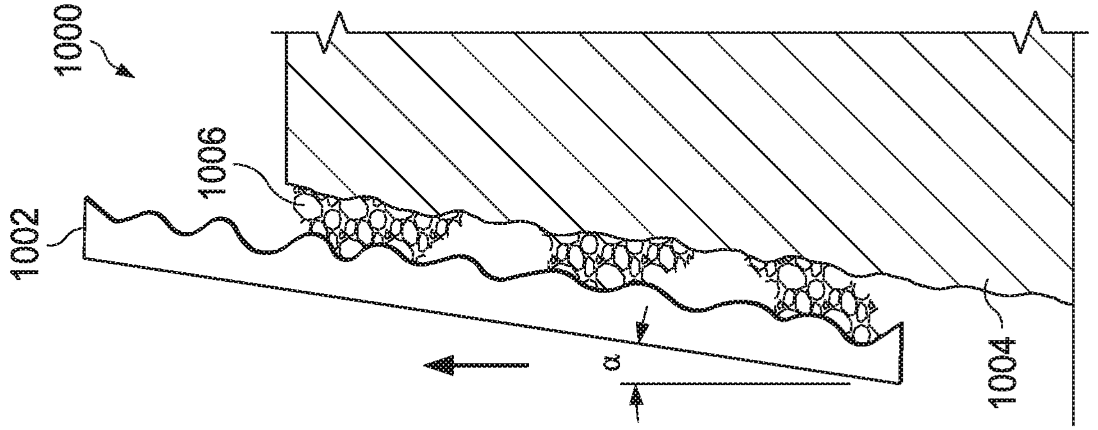
FIG. 10 is a diagram of a mold having an irregular groove cross section, in accordance with an example embodiment of the present disclosure.

FIG. 10 is a diagram of a mold 1000 having an irregular groove cross section, in accordance with an example embodiment of the present disclosure. Mold 1000 includes a plurality of irregular protrusions from mold wall 1002 with an angled protrusion at the bottom, and a draft towards masonry block 1004, which allows debris 1006 to accumulate to create a roughened surface and which also accommodates for expansion of the masonry. The irregular protrusions are periodically or randomly spaced and have a periodic or random height that is less than the thickness of the mold wall, but can alternatively have a greater height than the thickness of the mold wall. The irregular protrusions can alternatively be of different sizes and shapes, can be of other suitable shapes, and the angle of inclination can be approximately 1.3 degrees+/−40%.

Figure 11:
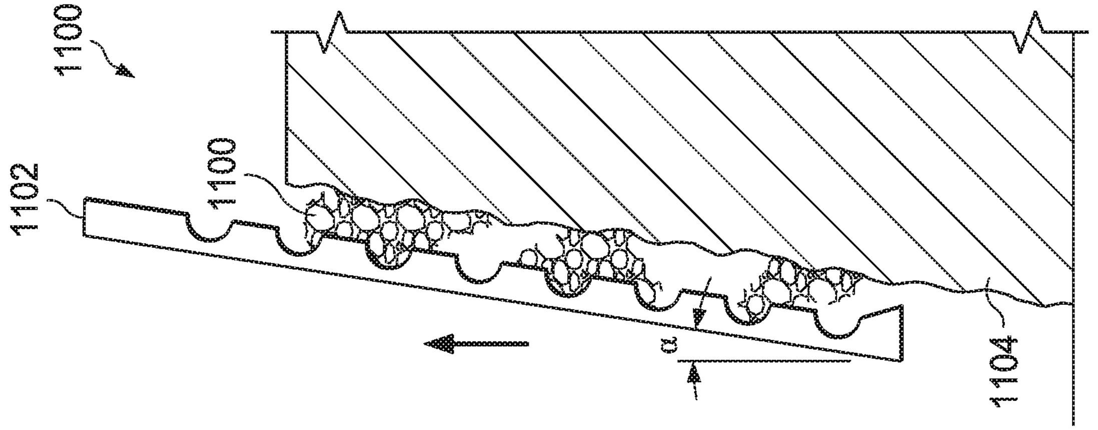
FIG. 11 is a diagram of a mold having a spaced semicircular groove cross section, in accordance with an example embodiment of the present disclosure.

FIG. 11 is a diagram of a mold 1100 having a spaced semicircular groove cross section, in accordance with an example embodiment of the present disclosure. Mold 1100 includes a plurality of semicircular indentations into mold wall 1102 with an angled protrusion at the bottom, and a draft towards masonry block 1104, which allows debris 1106 to accumulate to create a roughened surface and which also accommodates for expansion of the masonry. The indentations are regularly spaced and have a depth that is less than the thickness of the mold wall. The indentations can alternatively be of different sizes and shapes, can be square, trapezoidal or of other suitable shapes, and the angle of inclination can be approximately 1.3 degrees+/−40%.

In one example embodiment, the rectangular groove cross section of mold 900, the irregular groove cross section of mold 1000 and the semicircular groove cross section of mold 1100 can be part of the same irregular groove feature, which can have grooves that change in size and shape across the surface of the section of the mold that is used to generate the roughened surface on the masonry block. In the example embodiment, the size and spacing of the rectangles in the rectangular groove section and the size and the spacing of the semicircles in the semicircular groove section can be irregular. In addition, the different groove sections can be combined, such that at any point there can be rectangular groove cross sections, irregular groove cross sections and semicircular groove cross sections.

As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. An apparatus comprising:

a substantially smooth internal mold surface forming a cavity; and one or more roughened sections of the substantially smooth internal mold surface having a plurality of irregular grooves, wherein each roughened section is disposed between a wider planar base and a narrower planar top, with an inclination between the wider planar base and the narrower planar top sufficient to allow debris to accumulate.

2. The apparatus of claim 1 wherein the one or more roughened sections form a v-shaped section.

3. The apparatus of claim 1 wherein the one or more roughened sections comprise a first planar roughened section and a second planar roughened section.

4. The apparatus of claim 1 wherein the one or more roughened sections comprise a first planar roughened section and a second planar roughened section that meet to form a v-shaped section.

5. The apparatus of claim 1 wherein the one or more roughened sections comprise a first planar roughened section and a second planar roughened section that meet to form a v-shaped section and an angle of incline from the wider planar base to the narrower planar top is 1.3 degrees+/−40% from perpendicular relative to a plane of the wider planar base to increase a distance between a masonry block and the first planar roughened section and the second planar roughened section as a mold is removed from the masonry block.

6. The apparatus of claim 1 wherein the one or more roughened sections form a first v-shaped section and a second v-shaped section.

7. The apparatus of claim 1 wherein the one or more roughened sections comprise a first planar roughened section, a second planar roughened section, a third planar roughened section and a fourth planar roughened section.

8. The apparatus of claim 1 wherein the one or more roughened sections comprise a first planar roughened section and a second planar roughened section that meet to form a first v-shaped section and a third planar roughened section and a fourth planar roughened section that meet to form a second v-shaped section.

9. The apparatus of claim 1 wherein the one or more roughened sections comprise a first planar roughened section and a second planar roughened section that meet to form a first v-shaped section and a third planar roughened section and a fourth planar roughened section that meet to form a second v-shaped section and an angle of incline from the wider planar base to the narrower planar top is 1.3 degrees+/−40% from perpendicular relative to a plane of the wider planar base.

10. The apparatus of claim 1 wherein the one or more roughened sections form a first v-shaped section and a second v-shaped section opposite the first v-shaped section.

11. The apparatus of claim 1 wherein the one or more roughened sections comprise a first planar roughened section and a second planar roughened section that are opposite a third planar roughened section and a fourth planar roughened section.

12. The apparatus of claim 1 wherein the one or more roughened sections comprise a first planar roughened section and a second planar roughened section that meet to form a first v-shaped section that is opposite a third planar roughened section and a fourth planar roughened section that meet to form a second v-shaped section.

13. The apparatus of claim 1 wherein the one or more roughened sections comprise a first planar roughened section and a second planar roughened section that meet to form a first v-shaped section and a third planar roughened section and a fourth planar roughened section that meet to form a second v-shaped section and an angle of incline from the wider planar base to the narrower planar top is 1.3 degrees+/−40% from perpendicular relative to a plane of the wider planar base.

14. The apparatus of claim 1 wherein the one or more roughened sections form a first shaped section and a second shaped section opposite the first shaped section.

15. The apparatus of claim 1 wherein the one or more roughened sections comprise a first roughened shaped section and a second roughened shaped section that are opposite a third roughened shaped section and a fourth roughened shaped section.

16. The apparatus of claim 1 wherein the one or more roughened sections comprise a first roughened shaped section and a second roughened shaped section that form a first combined shaped section that is separate from a third roughened shaped section and a fourth roughened shaped section that meet to form a second combined shaped section.

17. The apparatus of claim 1 wherein the one or more roughened sections comprise a first roughened shaped section and a second roughened shaped section that meet to form a first combined shaped section and a third roughened shaped section and a fourth roughened shaped section that meet to form a second combined section and an angle of incline from the wider planar base to the narrower planar top is 1.3 degrees+/−40% from perpendicular relative to a plane of the wider planar base.

18. The apparatus of claim 1 wherein the inclination between the wider planar base and the narrower planar top is sufficient to allow the debris to accumulate between a masonry block and the roughened section.

19. The apparatus of claim 1 wherein the inclination between the wider planar base and the narrower planar top is sufficient to allow the debris to accumulate between a masonry block and the roughened section when a mold is being removed.

20. The apparatus of claim 1 wherein the inclination between the wider planar base and the narrower planar top is sufficient to allow the debris to accumulate between a masonry block and the roughened section when a mold containing the roughened section is removed.

* * * * *